United States Patent
Liu et al.

(10) Patent No.: US 9,813,549 B2
(45) Date of Patent: Nov. 7, 2017

(54) VOICE SERVICE EVALUATION PROCESSING METHOD AND APPARATUS

(71) Applicant: Huawei Technologies Co., Ltd., Shenzhen (CN)

(72) Inventors: Yijun Liu, Shenzhen (CN); Lujia Pan, Shenzhen (CN); Guangjian Tian, Hong Kong (HK)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/971,103

(22) Filed: Dec. 16, 2015

(65) Prior Publication Data

US 2016/0105544 A1   Apr. 14, 2016

Related U.S. Application Data

(63) Continuation of application No. PCT/CN2015/072609, filed on Feb. 10, 2015.

(30) Foreign Application Priority Data

Jun. 16, 2014  (CN) .......................... 2014 1 0266958

(51) Int. Cl.
*H04M 15/00* (2006.01)
*H04M 3/22* (2006.01)
(Continued)

(52) U.S. Cl.
CPC .......... *H04M 3/2227* (2013.01); *G06F 17/30* (2013.01); *G06Q 10/06* (2013.01)

(58) Field of Classification Search
USPC ................................ 379/112.01, 112.06, 133
See application file for complete search history.

(56) References Cited

U.S. PATENT DOCUMENTS 6,574,216 B1 * 6/2003 Farris ................. H04L 41/5009
                                                       370/237
6,785,361 B1 * 8/2004 Mahon ................ H04M 3/2254
                                                       379/112.06
(Continued)

FOREIGN PATENT DOCUMENTS

CN        1905725 A     1/2007
CN      102448083 A     5/2012
(Continued)

OTHER PUBLICATIONS

Partial English Translation and Abstract of Chinese Patent Application No. CN103686833A, Dec. 18, 2015, 7 pages.
(Continued)

*Primary Examiner* — Quoc D Tran
(74) *Attorney, Agent, or Firm* — Conley Rose, P.C.

(57) ABSTRACT

A voice service evaluation processing method and apparatus may include acquiring record data related to a to-be-evaluated voice service; using a voice service evaluation model that is acquired according to record data related to a voice service to evaluate the record data related to the to-be-evaluated voice service, so as to acquire an evaluation value of the record data related to the to-be-evaluated voice service; and performing, according to the evaluation value, evaluation processing on a voice service corresponding to the record data related to the to-be-evaluated voice service. The embodiments of the present disclosure provide a more reliable basis for improvement and optimization of a voice service. In addition, an actual status of a network may further be reflected according to evaluation performed on record data related to the voice service, and adjustment on a network indicator may further be performed according to the reflected network status.

14 Claims, 5 Drawing Sheets

(51) Int. Cl.
*G06F 17/30* (2006.01)
*G06Q 10/06* (2012.01)

(56) References Cited

U.S. PATENT DOCUMENTS

| | | | | |
|---|---|---|---|---|
| 6,914,967 | B1* | 7/2005 | Baca | H04M 15/00 |
| | | | | 379/112.08 |
| 7,076,036 | B1* | 7/2006 | Johnson | H04M 15/00 |
| | | | | 379/112.01 |
| 8,503,313 | B1* | 8/2013 | Lang | H04L 65/80 |
| | | | | 370/252 |
| 9,119,086 | B1* | 8/2015 | Ouyang | H04W 24/02 |
| 2006/0252376 | A1* | 11/2006 | Fok | H04M 3/2236 |
| | | | | 455/67.13 |
| 2009/0215444 | A1* | 8/2009 | Topaltzas | H04W 24/06 |
| | | | | 455/425 |
| 2014/0226800 | A1* | 8/2014 | Aggarwal | H04M 3/2227 |
| | | | | 379/32.01 |
| 2015/0339600 | A1* | 11/2015 | Dodson | G06Q 10/04 |
| | | | | 703/2 |

FOREIGN PATENT DOCUMENTS

| | | |
|---|---|---|
| CN | 102790996 A | 11/2012 |
| CN | 103560919 A | 2/2014 |
| CN | 103686833 A | 3/2014 |

OTHER PUBLICATIONS

Partial English Translation and Abstract of Chinese Patent Application No. CN103560919A, Apr. 21, 2016, 13 pages.
Foreign Communication From a Counterpart Application, PCT Application No. PCT/CN2015/072609, Partial English Translation of Search Report dated May 15, 2015, 2 pages.
Foreign Communication From a Counterpart Application, PCT Application No. PCT/CN2015/072609, Partial English Translation of Written Opinion dated May 15, 2015, 5 pages.

* cited by examiner

VOICE SERVICE EVALUATION PROCESSING METHOD AND APPARATUS

CROSS-REFERENCE TO RELATED APPLICATIONS

This application is a continuation of International Application No. PCT/CN2015/072609, filed on Feb. 10, 2015, which claims priority to Chinese Patent Application No. 201410266958.5, filed on Jun. 16, 2014, both of which are hereby incorporated by reference in their entireties.

TECHNICAL FIELD

The present disclosure relates to communications technologies, and in particular, to a voice service evaluation processing method and apparatus.

BACKGROUND

Currently, in voice services provided by an operator, basic voice services still occupy most of the proportion. To be capable of making targeted improvement and optimization of the voice services, and improving a service level, analysis and evaluation need to be performed on voice service data.

In the prior art, a method mainly used for voice service evaluation includes, if a time interval between consecutive occurrences of two times of communication between two same communication parties is extremely short, it is considered that communication of the first time is communication with poorer quality. That is, communication quality is determined only according to a time interval between two consecutive times of communication.

The use of the prior art causes that a limitation exists during the voice service evaluation, and a probability of erroneous determining and missed determining is relatively high.

SUMMARY

Embodiments of the present disclosure provide a voice service evaluation processing method and apparatus, which are used to resolve a problem in the prior art that a limitation exists during voice service evaluation.

A first aspect of the embodiments of the present disclosure provides a voice service evaluation processing method, including acquiring record data related to a to-be-evaluated voice service; using a voice service evaluation model that is acquired according to record data related to a voice service to evaluate the record data related to the to-be-evaluated voice service, so as to acquire an evaluation value of the record data related to the to-be-evaluated voice service; and performing, according to the evaluation value, evaluation processing on a voice service corresponding to the record data related to the to-be-evaluated voice service.

With reference to the first aspect, in a first possible implementation manner of the first aspect, before the using a voice service evaluation model that is acquired according to record data related to a voice service to evaluate the record data related to the to-be-evaluated voice service, the method further includes acquiring the record data related to the voice service; and acquiring the voice service evaluation model according to the record data related to the voice service.

With reference to the first possible implementation manner of the first aspect, in a second possible implementation manner of the first aspect, the record data related to the voice service includes attribute data related to the voice service, and correspondingly, the acquiring the voice service evaluation model according to the record data related to the voice service includes acquiring the voice service evaluation model according to the attribute data related to the voice service.

With reference to the second possible implementation manner of the first aspect, in a third possible implementation manner of the first aspect, the acquiring the voice service evaluation model according to the attribute data related to the voice service includes using a clustering algorithm to cluster the attribute data related to the voice service, so as to acquire a preset quantity of attribute data clusters; calculating, according to attribute data in the clusters, cluster measurement indicator values corresponding to the clusters; ranking the clusters according to the cluster measurement indicator values corresponding to the clusters, so as to acquire a quality ranking result; and using a machine learning method to train the quality ranking result, so as to acquire the voice service evaluation model.

With reference to the third possible implementation manner of the first aspect, in a fourth possible implementation manner of the first aspect, the cluster measurement indicator values corresponding to the clusters include averages and standard deviations that are corresponding to the clusters.

With reference to the fourth possible implementation manner of the first aspect, in a fifth possible implementation manner of the first aspect, the ranking the clusters according to the cluster measurement indicator values corresponding to the clusters, so as to acquire a quality ranking result includes ranking the clusters according to the averages corresponding to the clusters and attribute characteristics of the attribute data in the clusters, so as to acquire a first ranking result; if the first ranking result includes clusters with a same average, ranking each group of clusters with a same average according to a corresponding standard deviation, so as to acquire a second ranking result; and acquiring the quality ranking result according to the first ranking result and the second ranking result.

With reference to any one of the second to the fifth possible implementation manners of the first aspect, in a sixth possible implementation manner of the first aspect, before the acquiring the voice service evaluation model according to the attribute data related to the voice service, the method further includes, if the attribute data related to the voice service includes two pieces of attribute data related to the voice service that have a correlation in attribute value distribution, deleting any piece of attribute data related to the voice service from the two pieces of attribute data related to the voice service.

With reference to any one of the second to the fifth possible implementation manners of the first aspect, in a seventh possible implementation manner of the first aspect, before the acquiring the voice service evaluation model according to the attribute data related to the voice service, the method further includes determining whether each piece of attribute data related to the voice service has a long tail effect; and if the attribute data related to the voice service includes attribute data that is related to the voice service and has a long tail effect, eliminating long tail data in the attribute data that is related to the voice service and has a long tail effect.

With reference to the seventh possible implementation manner of the first aspect, in an eighth possible implementation manner of the first aspect, the determining whether each piece of attribute data related to the voice service has a long tail effect includes determining, according to distribution of an attribute value corresponding to each piece of attribute data related to the voice service, whether each piece of attribute data related to the voice service has a long tail effect; and the eliminating long tail data in the attribute data that is related to the voice service and has a long tail effect includes determining a threshold of long tail data according to the distribution of the attribute value corresponding to each piece of attribute data related to the voice service; and eliminating, according to the threshold of long tail data, the long tail data in the attribute data that is related to the voice service and has a long tail effect.

With reference to any one of the second possible implementation manner to the eighth possible implementation manner of the first aspect, in a ninth possible implementation manner of the first aspect, the attribute data related to the voice service includes any one or any combination of the following items: time of ringing, time of answering, time of allocation, time of requesting authentication, time of requesting encryption, time of receiving a service request, time of hanging up, time of ending communication, release time, and call time.

A second aspect of the embodiments of the present disclosure provides a voice service evaluation processing apparatus, including an acquiring module configured to acquire record data related to a to-be-evaluated voice service; a first evaluation module configured to use a voice service evaluation model that is acquired according to record data related to a voice service to evaluate the record data related to the to-be-evaluated voice service, so as to acquire an evaluation value of the record data related to the to-be-evaluated voice service; and a second evaluation module configured to perform, according to the evaluation value, evaluation processing on a voice service corresponding to the record data related to the to-be-evaluated voice service.

With reference to the second aspect, in a first possible implementation manner of the second aspect, the apparatus further includes a model establishing module configured to acquire the record data related to the voice service, where the record data related to the voice service includes attribute data related to the voice service; and acquire the voice service evaluation model according to the record data related to the voice service.

With reference to the first possible implementation manner of the second aspect, in a second possible implementation manner of the second aspect, the record data related to the voice service includes the attribute data related to the voice service, and correspondingly, the model establishing module is configured to acquire the voice service evaluation model according to the attribute data related to the voice service.

With reference to the second possible implementation manner of the second aspect, in a third possible implementation manner of the second aspect, the model establishing module includes a clustering unit configured to use a clustering algorithm to cluster the attribute data related to the voice service, so as to acquire a preset quantity of attribute data clusters; a calculating unit configured to calculate, according to attribute data in the clusters, cluster measurement indicator values corresponding to the clusters; a ranking unit configured to rank the clusters according to the cluster measurement indicator values corresponding to the clusters, so as to acquire a quality ranking result; and a learning unit configured to use a machine learning method to train the quality ranking result, so as to acquire the voice service evaluation model.

With reference to the second possible implementation manner of the second aspect, in a fourth possible implementation manner of the second aspect, the cluster measurement indicator values corresponding to the clusters include averages and standard deviations that are corresponding to the clusters.

With reference to the fourth possible implementation manner of the second aspect, in a fifth possible implementation manner of the second aspect, the ranking unit is configured to rank the clusters according to the averages corresponding to the clusters and attribute characteristics of the attribute data in the clusters, so as to acquire a first ranking result; if the first ranking result includes clusters with a same average, rank each group of clusters with a same average according to a corresponding standard deviation, so as to acquire a second ranking result; and acquire the quality ranking result according to the first ranking result and the second ranking result.

With reference to any one of the second to the fifth possible implementation manners of the second aspect, in a sixth possible implementation manner of the second aspect, the apparatus further includes a first optimization module configured to, if the attribute data related to the voice service includes two pieces of attribute data related to the voice service that have a correlation in attribute value distribution, delete any piece of attribute data related to the voice service from the two pieces of attribute data related to the voice service.

With reference to any one of the second to the fifth possible implementation manners of the second aspect, in a seventh possible implementation manner of the second aspect, the apparatus further includes a second optimization module configured to determine whether each piece of attribute data related to the voice service has a long tail effect; and if the attribute data related to the voice service includes attribute data that is related to the voice service and has a long tail effect, eliminate long tail data in the attribute data that is related to the voice service and has a long tail effect.

With reference to the seventh possible implementation manner of the second aspect, in an eighth possible implementation manner of the second aspect, the second optimization module is configured to determine, according to distribution of an attribute value corresponding to each piece of attribute data related to the voice service, whether each piece of attribute data related to the voice service has a long tail effect; and determine a threshold of long tail data according to the distribution of the attribute value corresponding to each piece of attribute data related to the voice service; and eliminate, according to the threshold of long tail data, the long tail data in the attribute data that is related to the voice service and has a long tail effect.

With reference to any one of the second possible implementation manner to the eighth possible implementation manner of the second aspect, in a ninth possible implementation manner of the second aspect, the attribute data related to the voice service includes any one or any combination of the following items: time of ringing, time of answering, time of allocation, time of requesting authentication, time of requesting encryption, time of receiving a service request, time of hanging up, time of ending communication, release time, and call time.

In the embodiments of the present disclosure, record data related to a to-be-evaluated voice service is acquired, a voice service evaluation model that is acquired according to record data related to a voice service is used to evaluate the record data related to the to-be-evaluated voice service, so as to acquire an evaluation value of the record data related to the to-be-evaluated voice service, and comprehensive evaluation processing is further performed, according to the evaluation values of the record data related to the voice service, on a voice service corresponding to the record data related to the to-be-evaluated voice service, so that a more reliable basis is provided for improvement and optimization of the voice service. In addition, an actual status of a network may further be reflected according to evaluation performed on the record data related to the voice service, and adjustment on a network indicator may further be performed according to the reflected network status.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
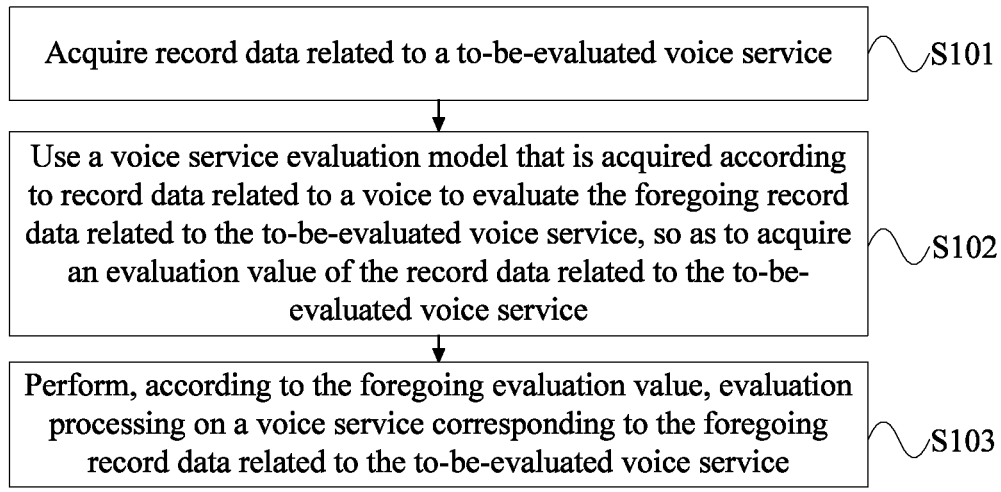
FIG. 1 is a schematic flowchart of an embodiment of a voice service evaluation processing method according to the present disclosure.

FIG. 1 is a schematic flowchart of Embodiment 1 of a voice service evaluation processing method according to the present disclosure. As shown in FIG. 1, the method includes the following steps:

S101. Acquire record data related to a to-be-evaluated voice service.

Record data related to a voice service refers to data that is in a voice service process and completely recorded in a background in the process of performing the voice service.

S102. Use a voice service evaluation model that is acquired according to record data related to a voice to evaluate the foregoing record data related to the to-be-evaluated voice service, so as to acquire an evaluation value of the record data related to the to-be-evaluated voice service.

The voice service evaluation model herein is acquired according to a large quantity of historical record data related to a voice service. The foregoing acquired record data related to the to-be-evaluated voice service may also be used in the future to establish a voice service evaluation model.

S103. Perform, according to the foregoing evaluation value, evaluation processing on a voice service corresponding to the foregoing record data related to the to-be-evaluated voice service.

The evaluation value of the record data related to the to-be-evaluated voice service is acquired using the voice service evaluation model, and then, the voice service is further analyzed and evaluated comprehensively according to the evaluation value, so that comprehensive and reliable evaluation can be performed on the voice service.

In this embodiment, record data related to a to-be-evaluated voice service is acquired, a voice service evaluation model that is acquired according to record data related to a voice service is used to evaluate the record data related to the to-be-evaluated voice service, so as to acquire an evaluation value of the record data related to the to-be-evaluated voice service, and comprehensive evaluation processing is further performed, according to the evaluation values of the record data related to the voice service, on a voice service corresponding to the record data related to the to-be-evaluated voice service, so that a more reliable basis is provided for improvement and optimization of the voice service. In addition, an actual status of a network may further be reflected according to evaluation performed on the record data related to the voice service, and adjustment on a network indicator may further be performed according to the reflected network status.

Before the using a voice service evaluation model that is acquired according to record data related to a voice to evaluate the foregoing record data related to the to-be-evaluated voice service, the method includes acquiring the record data related to the voice service, and acquiring the foregoing voice service evaluation model according to the record data related to the voice service.

The record data related to the voice service includes attribute data related to the voice service. Generally, one piece of record data related to the voice service may include multiple pieces of attribute data related to the voice service. Correspondingly, the acquiring the foregoing voice service evaluation model according to the record data related to the voice service is acquiring the voice service evaluation model according to the foregoing attribute data related to the voice service.

The attribute data related to the voice service may include mobile originated call (MOC) data, mobile terminated call (MTC) data, and the like, but is not limited thereto. It should be noted that, in a process of performing voice communication, all data in the entire communication process is completely recorded in a background, and before a model is established, a large quantity of record data related to a voice service is acquired from a database. The record data includes a large quantity of attribute data. Attribute values corresponding to the attribute data and distribution of the attribute values may be acquired at the time when the attribute data is acquired. It should be noted that, when specific evaluation is performed, the evaluation is performed on an entirety of received record data related to a to-be-evaluated voice service to acquire an evaluation value, rather than on a piece of attribute data in the received record data related to the to-be-evaluated voice service.

More specifically, the foregoing attribute data related to the voice service may include any one or any combination of the following items: time of ringing, time of answering, time of allocation, time of requesting authentication, time of requesting encryption, time of receiving a service request, time of hanging up, time of ending communication, release time, and call time. In a specific implementation process, the attribute data may be a specific attribute field in the foregoing MOC data or MTC data, but is not limited thereto.

Figure 2:
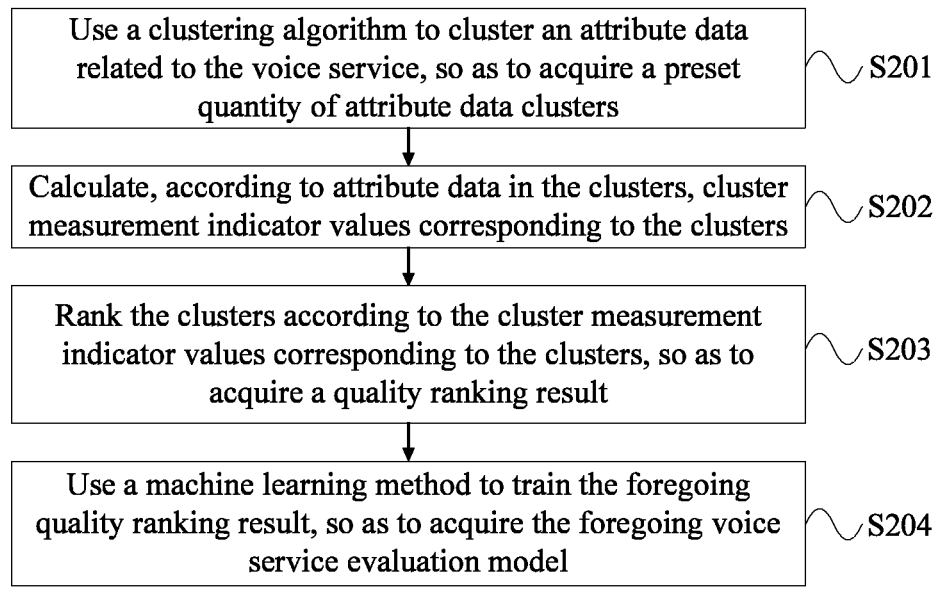
FIG. 2 is a schematic flowchart of an embodiment of a voice service evaluation processing method according to the present disclosure.

FIG. 2 is a schematic flowchart of Embodiment 2 of a voice service evaluation processing method according to the present disclosure. As shown in FIG. 2, the acquiring the foregoing voice service evaluation model according to the attribute data related to the voice service may be as follows:

corresponding to each piece of attribute data and distribution of these attribute values may be acquired simultaneously.

S203. Rank the clusters according to the cluster measurement indicator values corresponding to the clusters, so as to acquire a quality ranking result.

S204. Use a machine learning method to train the foregoing quality ranking result, so as to acquire the foregoing voice service evaluation model.

Herein, the machine learning method may use a support vector machine (SVM), but is not limited thereto. Certainly, with constant updating of data, the model may be constantly updated according to new data.

Still further, the foregoing cluster measurement indicator values corresponding to the clusters may include averages and standard deviations that are corresponding to the clusters, but are not limited thereto.

It is assumed that there are five clusters for the attribute data after clustering is performed; for example, Table 1 records averages respectively corresponding to attribute data in the five clusters, and Table 2 records standard deviations corresponding to the attribute data in the five clusters.

TABLE 1

|    | Time of ringing | Time of answering | Time of allocation | Time of requesting authentication | Time of requesting encryption | Time of receiving a service request | Time of hanging up | Time of ending communication | Release time | Call time |
|----|-----------------|-------------------|--------------------|-----------------------------------|-------------------------------|-------------------------------------|--------------------|------------------------------|--------------|-----------|
| c1 | 2489.1          | 5774.884          | 909.599            | 24.049                            | 749.71                        | 303.872                             | 55320              | 762.369                      | 272.173      | 429.127   |
| c2 | 0               | 0                 | 1125.141           | 15.211                            | 283.32                        | 174.584                             | 5850.797           | 2292                         | 313.638      | 183.315   |
| c3 | 1732.703        | 3616.648          | 873.295            | 18.512                            | 713.727                       | 290.755                             | 0                  | 32436                        | 0            | 404.769   |
| c4 | 0               | 0                 | 615.219            | 18.726                            | 732.209                       | 317.04                              | 6667               | 615.42                       | 296.901      | 443.829   |
| c5 | 2494.77         | 5763.113          | 907.416            | 10.865                            | 754.58                        | 299.24                              | 55209              | 896.1                        | 275.98       | 430.737   |

TABLE 2

|    | Time of ringing | Time of answering | Time of allocation | Time of requesting authentication | Time of requesting encryption | Time of receiving a service request | Time of hanging up | Time of ending communication | Release time | Call time |
|----|-----------------|-------------------|--------------------|-----------------------------------|-------------------------------|-------------------------------------|--------------------|------------------------------|--------------|-----------|
| c1 | 2908            | 5537.3            | 648                | 3.633                             | 183.793                       | 123.8                               | 70128              | 9782                         | 2586         | 119.7     |
| c2 | 0               | 0                 | 1027.7             | 9.614                             | 184.18                        | 138.4                               | 7419               | 17416                        | 619.8        | 216       |
| c3 | 2358.485        | 5037.6            | 768.9              | 7.461                             | 224.6                         | 138.6                               | 0                  | 63942                        | 0            | 155       |
| c4 | 0               | 0                 | 591.6              | 7.185                             | 152.9                         | 129.6                               | 7676               | 7307                         | 604.7        | 106.671   |
| c5 | 2912            | 5536.5            | 650.3              | 2.94                              | 199.5                         | 128.1                               | 70098              | 11064                        | 2773         | 124.874   |

S201. Use a clustering algorithm to cluster the foregoing attribute data related to the voice service, so as to acquire a preset quantity of attribute data clusters. That is, a quantity of clusters into which the attribute data is clustered may be preset according to a specific requirement.

The clustering algorithm is not limited herein, and a proper clustering algorithm may be selected according to a specific application scenario.

S202. Calculate, according to attribute data in the clusters, cluster measurement indicator values corresponding to the clusters.

Each cluster includes at least one type of attribute data, and each piece of attribute data may be corresponding to multiple different attribute values. A cluster measurement indicator value corresponding to each cluster may be calculated according to these attribute values.

Figure 3:
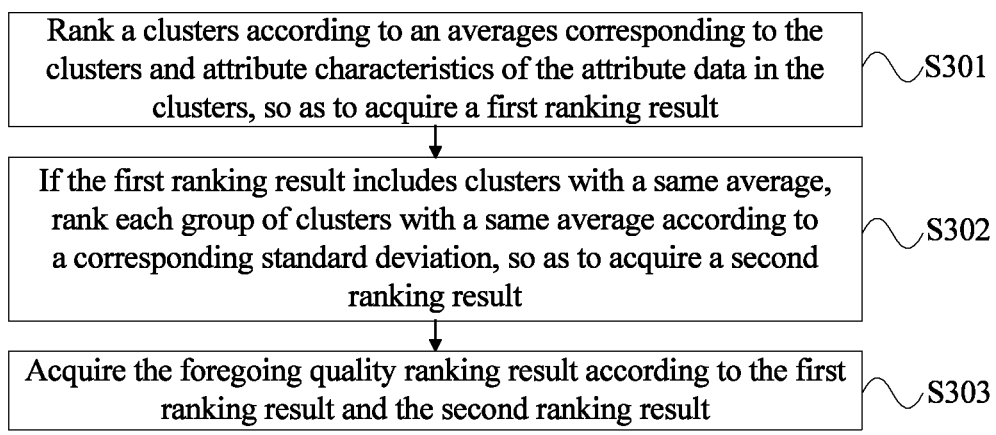
FIG. 3 is a schematic flowchart of an embodiment of a voice service evaluation processing method according to the present disclosure.

When the acquiring the attribute data related to the voice service is performed, a large quantity of attribute values FIG. 3 is a schematic flowchart of Embodiment 3 of a voice service evaluation processing method according to the present disclosure. As shown in FIG. 3, the averages and the standard deviations that are corresponding to the clusters are used as an example for description, and the ranking the clusters according to the cluster measurement indicator values corresponding to the clusters, so as to acquire a quality ranking result may be as follows:

S301. Rank the foregoing clusters according to the foregoing averages corresponding to the clusters and attribute characteristics of the attribute data in the clusters, so as to acquire a first ranking result.

An attribute characteristic of the attribute data in the clusters is used to indicate that whether the attribute characteristic is better when an attribute value is larger, or is better when an attribute value is smaller. Therefore, when specific ranking is performed, the clusters are first ranked separately according to an average corresponding to each type of attribute data, and then the first ranking result of the clusters is comprehensively determined.

S302. If the first ranking result includes clusters with a same average, rank each group of clusters with a same average according to a corresponding standard deviation, so as to acquire a second ranking result.

It is assumed that there are five clusters (cluster) for the attribute data after clustering is performed, and the clusters are recorded as c1, c2, c3, c4, and c5. After ranking is performed according to averages, in a first ranking result, c3 has a same rank as c4, that is, c3 and c4 have a same average. Then, c3 and c4 are further ranked according to their standard deviations, so as to acquire a second ranking result.

Different from the averages, the standard deviations are used to indicate aggregation degrees of the clusters, and a smaller standard deviation indicates that attribute data in a corresponding cluster is more concentrated. Therefore, when ranking is performed according to the standard deviations, a smaller standard deviation indicates a corresponding cluster with better quality.

S303. Acquire the foregoing quality ranking result according to the first ranking result and the second ranking result. That is, by combining the first ranking result and the second ranking result, a final quality ranking result can be obtained by means of sorting.

The quality ranking result may be used as evaluation values of the clusters. The evaluation values are marked on corresponding data, and are used to acquire a model by means of learning.

An example is used to describe a ranking process. Data in Table 1 and Table 2 is used as an example to perform ranking, and Table 3 shows a ranking result. Each column in Table 3 indicates rankings of clusters corresponding to one type of attribute data, where the first column indicates a comprehensive evaluation value, that is, for a cluster that ranks the first place, five points are recorded; for a cluster that ranks the second place, four points are recorded, and so on. It should be noted that in Table 3, "↓" indicates that a smaller attribute value of corresponding attribute data indicates a better attribute, and "↑" indicates that a larger attribute value of corresponding attribute data indicates a better attribute.

Further, to optimize sample data, before the acquiring the foregoing voice service evaluation model according to the attribute data related to the voice service, the method further includes, if the foregoing attribute data related to the voice service includes two pieces of attribute data related to the voice service that have a correlation in attribute value distribution, deleting any piece of attribute data related to the voice service from the foregoing two pieces of attribute data related to the voice service. In a specific implementation process, attribute values of the attribute data related to the voice service may be sequentially compared in pairs. When comparison is made in pairs, if it is found that a correlation exists in distribution of the two attribute values, one of the two attribute values is deleted, and comparison may continually be performed on the remaining attribute value. By analogy, in multiple pieces of attribute data of which attribute value distribution characteristics are the same or similar, only one piece of attribute data may be reserved, so as to avoid an unnecessary weighted cumulative effect.

In addition, to optimize the sample data, before the acquiring the foregoing voice service evaluation model according to the attribute data related to the voice service, the method may further include determining whether each piece of attribute data related to the voice service has a long tail effect; and if the attribute data related to the voice service include attribute data that has a long tail effect, eliminating long tail data in the attribute data that is related to the voice service and has a long tail effect.

The determining whether each piece of attribute data related to the voice service has a long tail effect includes determining, according to distribution of an attribute value corresponding to each piece of attribute data related to the voice service, whether each piece of attribute data related to the voice service has a long tail effect.

Further, the eliminating long tail data in the foregoing attribute data that is related to the voice service and has a long tail effect includes determining a threshold of long tail data according to the distribution of the attribute value corresponding to each piece of attribute data related to the voice service, and eliminating, according to the threshold of long tail data, the long tail data in the attribute data that is

TABLE 3

| Row number | Evaluation value | Time of ringing ↓ | Time of answering ↓ | Time of allocation ↓ | Time of requesting authentication ↓ | Time of requesting encryption ↓ | Time of receiving a service request ↓ | Time of hanging up ↑ | Time of ending communication ↓ | Release time ↓ | Call time ↓ |
|---|---|---|---|---|---|---|---|---|---|---|---|
| 1 | c2 = 5 | c2 | c2 | c4 | c5 | c2 | c2 | c1 | c4 | c3 | c2 |
| 2 | c4 = 4 | c4 | c4 | c3 | c2 | c3 | c3 | c5 | c1 | c1 | c3 |
| 3 | c3 = 3 | c3 | c3 | c5 | c3 | c1 | c5 | c4 | c5 | c5 | c1 |
| 4 | c1 = 2 | c1 | c5 | c1 | c4 | c5 | c1 | c2 | c2 | c4 | c5 |
| 5 | c5 = 1 | c5 | c1 | c2 | c1 | c4 | c4 | c3 | c3 | c2 | c4 |

It can be seen from the first row that, a quantity of c2s included in attribute data that ranks the first place is the most; therefore, c2 is the best, and five points are recorded for c2. Then, in the first row, there are two c4s; therefore, c4 ranks the second place, and four points are recorded for c4. Rankings of c1, c3, and c5 cannot be determined according to the first row. Further, referring to the second row, there are four c3s, two c1s, and one c5; therefore, the rankings are successively as follows: c3 ranks the third place, and three points are recorded for c3; c1 ranks the fourth place, and two points are recorded for c1, and c5 ranks the fifth place, and one point is recorded for c5.

related to the voice service and has a long tail effect. More specifically, in each piece of attribute data, a "proportion of long tail data in all attribute values" and a "proportion of a range interval of long tail data in the attribute data" may be determined according to the distribution of the attribute value corresponding to each piece of attribute data. Then, the threshold of long tail data is determined according to data of which the "proportion of long tail data in all attribute values" is less than a first preset threshold and data of which the "proportion of a range interval of long tail data in the attribute data" is greater than a second preset threshold.

A specific piece of attribute data "time of requesting authentication" is used as an example. It is assumed that a quantity of attribute values corresponding to the attribute data is 10000, and that a quantity of pieces of data of which a range is distributed in an interval "10-1000" is 300; in this case, a proportion of long tail data in all attribute values is 3 percent (%). It is assumed that a range span of the attribute data is "1-1000", and according to distribution of corresponding attribute values, it is found that most of the attribute values concentrate in "1-10", and that a minority of values are distributed in "10-1000". In this case, a range interval of long tail data in the attribute data is "10-1000", that is, a proportion of the range interval of long tail data is 99%. It is assumed that a first threshold is 5%, and that a second threshold is 80%; then, data of which a "proportion of long tail data in all attribute values" is greater than or equal to 5% is reserved, and data of which a "proportion of a range interval of long tail data in the attribute data" is greater than or equal to 80% is reserved. The threshold of long tail data is determined according to data of which a "proportion of long tail data in all attribute values" is less than 5% and data of which a "proportion of a range interval of long tail data in the attribute data" is less than 80%.

In a specific implementation process, the range span of the attribute data may be divided into multiple range intervals to perform determining. For example, "1-1000" is divided into "1-50", "51-100", "101-150", . . . , and "951-1000", and then a proportion of a quantity of attribute values in each range interval to a quantity of all attribute values is determined by means of calculation, so as to determine a range interval of long tail data. Then, a "proportion of long tail data in all attribute values" and a "proportion of a range interval of long tail data in the attribute data" are further determined.

Figure 4:
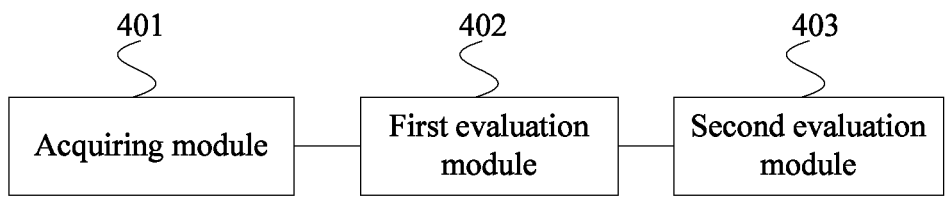
FIG. 4 is a schematic structural diagram of an embodiment of a voice service evaluation processing apparatus according to the present disclosure.

FIG. 4 is a schematic structural diagram of Embodiment 1 of a voice service evaluation processing apparatus according to the present disclosure. As shown in FIG. 4, the apparatus includes an acquiring module 401, a first evaluation module 402, and a second evaluation module 403, where the acquiring module 401 is configured to acquire record data related to a to-be-evaluated voice service; the first evaluation module 402 is configured to use a voice service evaluation model that is acquired according to record data related to a voice service to evaluate the record data related to the to-be-evaluated voice service, so as to acquire an evaluation value of the record data related to the to-be-evaluated voice service; and the second evaluation module 403 is configured to perform, according to the evaluation value, evaluation processing on a voice service corresponding to the record data related to the to-be-evaluated voice service.

Figure 5:
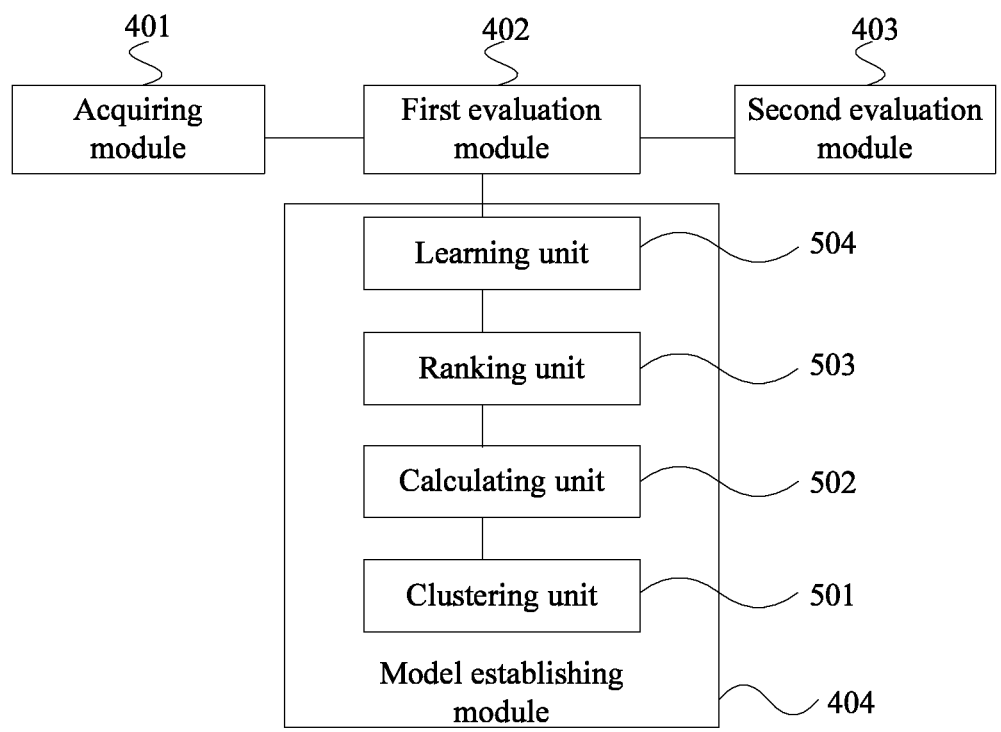
FIG. 5 is a schematic structural diagram of an embodiment of a voice service evaluation processing apparatus according to the present disclosure.

FIG. 5 is a schematic structural diagram of Embodiment 2 of a voice service evaluation processing apparatus according to the present disclosure. As shown in FIG. 5, on the basis of FIG. 4, the apparatus may further include a model establishing module 404 configured to acquire the record data related to the voice service, and acquire the voice service evaluation model according to the record data related to the voice service.

The record data related to the voice service includes attribute data related to the voice service. Correspondingly, the model establishing module 404 is configured to acquire the voice service evaluation model according to the attribute data related to the voice service.

Still referring to FIG. 5, the model establishing module 404 may further include a clustering unit 501, a calculating unit 502, a ranking unit 503, and a learning unit 504, where the clustering unit 501 is configured to use a clustering algorithm to cluster the attribute data related to the voice service, so as to acquire a preset quantity of attribute data clusters; the calculating unit 502 is configured to calculate, according to attribute data in the clusters, cluster measurement indicator values corresponding to the clusters; the ranking unit 503 is configured to rank the clusters according to the cluster measurement indicator values corresponding to the clusters, so as to acquire a quality ranking result; and the learning unit 504 is configured to use a machine learning method to train the quality ranking result, so as to acquire the voice service evaluation model.

It should be noted that, in a specific implementation process, the model establishing module 404 may be integrated into the foregoing apparatus, or may be an independent apparatus that only needs to transmit an established model to the foregoing voice service evaluation processing apparatus.

Further, the cluster measurement indicator values corresponding to the clusters include averages and standard deviations that are corresponding to the clusters.

Still further, the ranking unit 503 is configured to rank the clusters according to the averages corresponding to the clusters and attribute characteristics of the attribute data in the clusters, so as to acquire a first ranking result; if the first ranking result includes clusters with a same average, rank each group of clusters with a same average according to a corresponding standard deviation, so as to acquire a second ranking result; and acquire the quality ranking result according to the first ranking result and the second ranking result.

Figure 6:
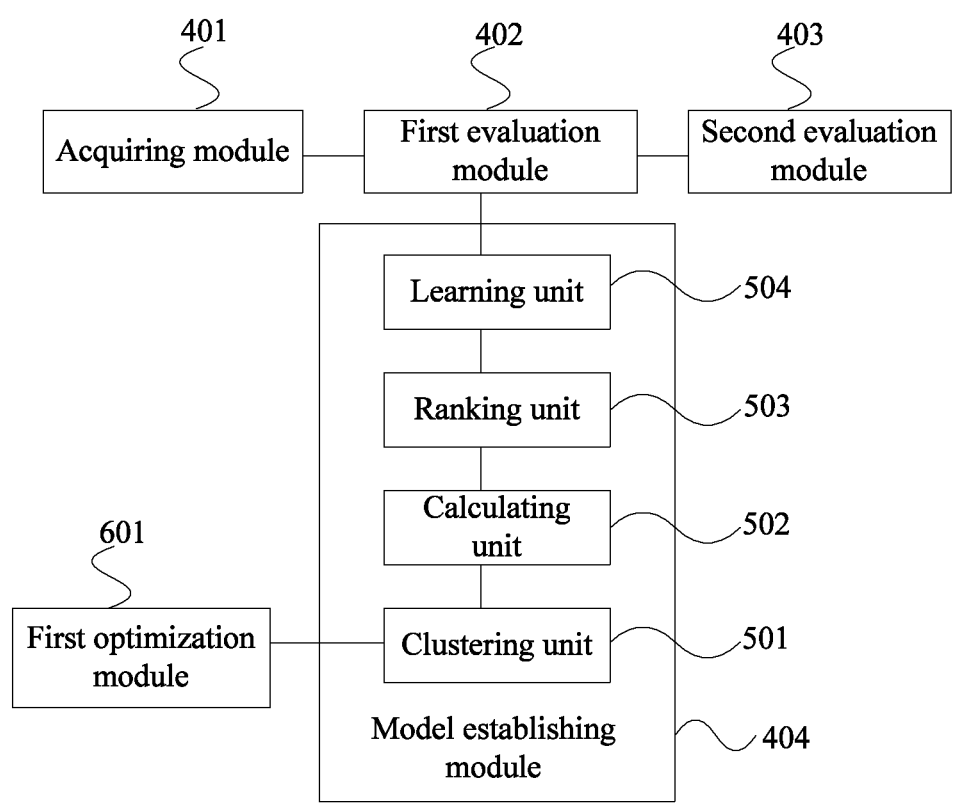
FIG. 6 is a schematic structural diagram of an embodiment of a voice service evaluation processing apparatus according to the present disclosure.

FIG. 6 is a schematic structural diagram of Embodiment 3 of a voice service evaluation processing apparatus according to the present disclosure. As shown in FIG. 6, on the basis of FIG. 5, the apparatus may further include a first optimization module 601 configured to, if the attribute data related to the voice service includes two pieces of attribute data related to the voice service that have a correlation in attribute value distribution, delete any piece of attribute data related to the voice service from the two pieces of attribute data related to the voice service.

Figure 7:
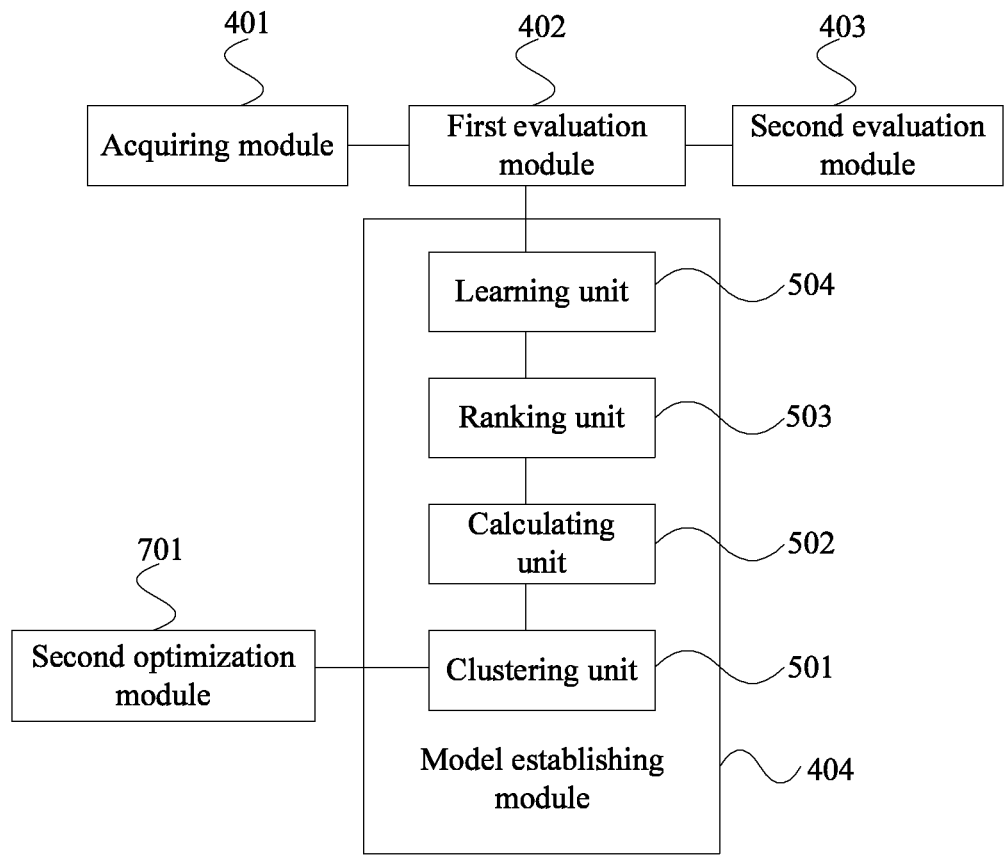
FIG. 7 is a schematic structural diagram of an embodiment of a voice service evaluation processing apparatus according to the present disclosure.

FIG. 7 is a schematic structural diagram of Embodiment 4 of a voice service evaluation processing apparatus according to the present disclosure. As shown in FIG. 7, on the basis of FIG. 5, the apparatus may further include a second optimization module 701 configured to determine whether each piece of attribute data related to the voice service has a long tail effect; and if the attribute data related to the voice service includes attribute data that is related to the voice service and has a long tail effect, eliminate long tail data in the attribute data that is related to the voice service and has a long tail effect.

More specifically, the second optimization module 701 is configured to determine, according to distribution of an attribute value corresponding to each piece of attribute data related to the voice service, whether each piece of attribute data related to the voice service has a long tail effect; and correspondingly, determine a threshold of long tail data according to the distribution of the attribute value corresponding to each piece of attribute data related to the voice service; and eliminate, according to the threshold of long tail data, the long tail data in the attribute data that is related to the voice service and has a long tail effect.

It should be noted that, in some application scenarios, the foregoing first optimization module 601 and the second optimization module 701 may exist simultaneously.

In addition, the attribute data related to the voice service includes any one or any combination of the following items: time of ringing, time of answering, time of allocation, time of requesting authentication, time of requesting encryption, time of receiving a service request, time of hanging up, time of ending communication, release time, and call time.

Figure 8:
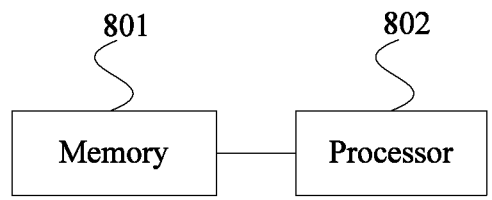
FIG. 8 is a schematic structural diagram of an embodiment of a voice service evaluation processing apparatus according to the present disclosure.

FIG. 8 is a schematic structural diagram of Embodiment 5 of a voice service evaluation processing apparatus according to the present disclosure. The apparatus includes a memory 801 and a processor 802, where the memory 801 is configured to store an instruction set; and the processor 802 is configured to invoke the instruction set in the memory 801 to execute the following procedure of acquiring record data related to a to-be-evaluated voice service; using a voice service evaluation model that is acquired according to record data related to a voice service to evaluate the record data related to the to-be-evaluated voice service, so as to acquire an evaluation value of the record data related to the to-be-evaluated voice service; and performing, according to the evaluation value, evaluation processing on a voice service corresponding to the record data related to the to-be-evaluated voice service.

Further, the processor 802 is further configured to, before the using a voice service evaluation model that is acquired according to record data related to a voice service to evaluate the record data related to the to-be-evaluated voice service, acquire the record data related to the voice service; and acquire the voice service evaluation model according to the record data related to the voice service.

The record data related to the voice service includes attribute data related to the voice service. Correspondingly, the processor 802 is configured to acquire the voice service evaluation model according to the attribute data related to the voice service.

The processor 802 is configured to use a clustering algorithm to cluster the attribute data related to the voice service, so as to acquire a preset quantity of attribute data clusters; calculate, according to attribute data in the clusters, cluster measurement indicator values corresponding to the clusters; rank the clusters according to the cluster measurement indicator values corresponding to the clusters, so as to acquire a quality ranking result; and use a machine learning method to train the quality ranking result, so as to acquire the voice service evaluation model.

The cluster measurement indicator values corresponding to the clusters include averages and standard deviations that are corresponding to the clusters.

More specifically, the processor 802 is configured to rank the clusters according to the averages corresponding to the clusters and attribute characteristics of the attribute data in the clusters, so as to acquire a first ranking result; if the first ranking result includes clusters with a same average, rank each group of clusters with a same average according to a corresponding standard deviation, so as to acquire a second ranking result; and acquire the quality ranking result according to the first ranking result and the second ranking result.

The processor 802 is further configured to, before acquiring the voice service evaluation model according to the attribute data related to the voice service, if the attribute data related to the voice service includes two pieces of attribute data related to the voice service that have a correlation in attribute value distribution, delete any piece of attribute data related to the voice service from the two pieces of attribute data related to the voice service.

The processor 802 is further configured to, before acquiring the voice service evaluation model according to the attribute data related to the voice service, determine whether each piece of attribute data related to the voice service has a long tail effect; and if the attribute data related to the voice service includes attribute data that is related to the voice service and has a long tail effect, eliminate long tail data in the attribute data that is related to the voice service and has a long tail effect.

The processor 802 is configured to, determine, according to distribution of an attribute value corresponding to each piece of attribute data related to the voice service, whether each piece of attribute data related to the voice service has a long tail effect; and correspondingly, determine a threshold of long tail data according to the distribution of the attribute value corresponding to each piece of attribute data related to the voice service; and eliminate, according to the threshold of long tail data, the long tail data in the attribute data that is related to the voice service and has a long tail effect.

In addition, the attribute data related to the voice service includes any one or any combination of the following items: time of ringing, time of answering, time of allocation, time of requesting authentication, time of requesting encryption, time of receiving a service request, time of hanging up, time of ending communication, release time, and call time.

In the several embodiments provided in the present disclosure, it should be understood that the disclosed apparatus and method may be implemented in other manners. For example, the foregoing described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The foregoing integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A voice service evaluation processing method, comprising:
   acquiring attribute data related to a voice service;
   using a clustering algorithm to cluster the attribute data related to the voice service, so as to acquire a preset quantity of attribute data clusters;
   calculating, according to the attribute data in the clusters, cluster measurement indicator values corresponding to the clusters;
   ranking the clusters according to the cluster measurement indicator values corresponding to the clusters, so as to acquire a quality ranking result;
   using a machine learning method to train the quality ranking result, so as to acquire voice service evaluation model;
   acquiring record data related to a to-be-evaluated voice service;
   evaluating the record data related to the to-be-evaluated voice service by the voice service evaluation model;
   acquiring an evaluation value of the record data related to the to-be-evaluated voice service; and
   performing, according to the evaluation value, evaluation processing on the to-be-evaluated voice service.

2. The method according to claim 1, wherein the cluster measurement indicator values corresponding to the clusters comprise averages and standard deviations that are corresponding to the clusters.

3. The method according to claim 2, wherein ranking the clusters according to the cluster measurement indicator values corresponding to the clusters comprises:
   ranking the clusters according to the averages corresponding to the clusters and attribute characteristics of the attribute data in the clusters, so as to acquire a first ranking result;
   ranking, when the first ranking result comprises clusters with a same average, each group of clusters with a same average according to a corresponding standard deviation, so as to acquire a second ranking result; and
   acquiring the quality ranking result according to the first ranking result and the second ranking result.

4. The method according to claim 1, wherein before acquiring the voice service evaluation model according to the attribute data related to the voice service, the method further comprises deleting, when the attribute data related to the voice service comprises two pieces of attribute data related to the voice service that have a correlation in attribute value distribution, any piece of attribute data related to the voice service from the two pieces of attribute data related to the voice service.

5. The method according to claim 1, wherein before acquiring the voice service evaluation model according to the attribute data related to the voice service, the method further comprises:
   determining whether each piece of attribute data related to the voice service has a long tail effect; and
   eliminating, when the attribute data related to the voice service comprises attribute data that is related to the voice service and has a long tail effect, long tail data in the attribute data that is related to the voice service and has a long tail effect.

6. The method according to claim 5, wherein determining whether each piece of the attribute data related to the voice service has the long tail effect comprises determining, according to distribution of an attribute value corresponding to each piece of attribute data related to the voice service, whether each piece of attribute data related to the voice service has a long tail effect, and wherein eliminating long tail data in the attribute data that is related to the voice service and has the long tail effect comprises:
   determining a threshold of long tail data according to the distribution of the attribute value corresponding to each piece of attribute data related to the voice service; and
   eliminating, according to the threshold of long tail data, the long tail data in the attribute data that is related to the voice service and has a long tail effect.

7. The method according to claim 1, wherein the attribute data related to the voice service comprises any one or any combination of: time of ringing, time of answering, time of allocation, time of requesting authentication, time of requesting encryption, time of receiving a service request, time of hanging up, time of ending communication, release time, and call time.

8. A voice service evaluation processing apparatus, comprising:
   a memory configured to store instruction sets; and
   a processor coupled to the memory and configured to:
      acquire attribute data related to a voice service;
      use a clustering algorithm to cluster the attribute data related to the voice service, so as to acquire a preset quantity of attribute data clusters;
      calculate, according to the attribute data in the clusters, cluster measurement indicator values corresponding to the clusters;
      rank the clusters according to the cluster measurement indicator values corresponding to the clusters, so as to acquire a quality ranking result;
      use a machine learning method to train the quality ranking result, so as to acquire a voice service evaluation model;
      acquire record data related to a to-be-evaluated voice service;
      evaluate the record data related to the to-be-evaluated voice service by the voice service evaluation model;
      acquire an evaluation value of the record data related to the to-be-evaluated voice service; and
      perform, according to the evaluation value, evaluation processing on the to-be-evaluated voice service.

9. The apparatus according to claim 8, wherein the cluster measurement indicator values corresponding to the clusters comprise averages and standard deviations that are corresponding to the clusters.

10. The apparatus according to claim 9, wherein the processor is further configured to:
    rank the clusters according to the averages corresponding to the clusters and attribute characteristics of the attribute data in the clusters, so as to acquire a first ranking result;
    rank, when the first ranking result comprises clusters with a same average, each group of clusters with a same average according to a corresponding standard deviation, so as to acquire a second ranking result; and
    acquire the quality ranking result according to the first ranking result and the second ranking result.

11. The apparatus according to claim 8, wherein the processor is further configured to:
    determine whether each piece of attribute data related to the voice service has a long tail effect; and
    eliminate, when the attribute data related to the voice service comprises attribute data that is related to the voice service and has a long tail effect, long tail data in the attribute data that is related to the voice service and has a long tail effect.

12. The apparatus according to claim 11, wherein the processor is further configured to:
   determine, according to distribution of an attribute value corresponding to each piece of attribute data related to the voice service, whether each piece of attribute data related to the voice service has a long tail effect;
   determine a threshold of long tail data according to the distribution of the attribute value corresponding to each piece of attribute data related to the voice service; and
   eliminate, according to the threshold of long tail data, the long tail data in the attribute data that is related to the voice service and has a long tail effect.

13. The apparatus according to claim 8, wherein the attribute data related to the voice service comprises any one or any combination of: time of ringing, time of answering, time of allocation, time of requesting authentication, time of requesting encryption, time of receiving a service request, time of hanging up, time of ending communication, release time, and call time.

14. A voice service evaluation processing apparatus, comprising:
   a memory configured to store instruction sets;
   a processor coupled to the memory and configured to:
      acquire record data related to a to-be-evaluated voice service;
      evaluate the record data related to the to-be-evaluated voice service by a voice service evaluation model, wherein the voice service evaluation model is acquired according to historical record data related to a voice service;
      acquire an evaluation value of the record data related to the to-be-evaluated voice service; and
      perform, according to the evaluation value, evaluation processing on the to-be-evaluated voice service;
      acquire the record data related to the voice service, wherein the record data related to the voice service comprises attribute data related to the voice service;
      acquire the voice service evaluation model according to the attribute data related to the voice service; and
      delete, when the attribute data related to the voice service comprises two pieces of attribute data related to the voice service that have a correlation in attribute value distribution, any piece of attribute data related to the voice service from the two pieces of attribute data related to the voice service.

* * * * *